United States Patent
Ikeno et al.

(10) Patent No.: US 12,404,958 B2
(45) Date of Patent: Sep. 2, 2025

(54) ROTATING JOINT

(71) Applicants: NACHI-FUJIKOSHI CORP., Tokyo (JP); NACHI TohokuSeiko Co., Ltd., Yamagata (JP)

(72) Inventors: Shinichi Ikeno, Toyama (JP); Miyabi Togashi, Yamagata (JP)

(73) Assignees: NACHI-FUJIKOSHI CORP., Tokyo (JP); NACHI TohokuSeiko Co., Ltd., Yamagata (JP)

(*) Notice: Subject to any disclaimer, the term of this patent is extended or adjusted under 35 U.S.C. 154(b) by 0 days.

(21) Appl. No.: 18/634,122

(22) Filed: Apr. 12, 2024

(65) Prior Publication Data

US 2024/0360929 A1   Oct. 31, 2024

(30) Foreign Application Priority Data

Apr. 14, 2023 (JP) ................. 2023-066523

(51) Int. Cl.
*F16L 27/08* (2006.01)
*F16L 27/087* (2006.01)
*G01B 7/30* (2006.01)

(52) U.S. Cl.
CPC ......... *F16L 27/0804* (2013.01); *F16L 27/087* (2013.01); *G01B 7/30* (2013.01)

(58) Field of Classification Search
CPC ............... F16L 27/0804; F16L 27/0808; F16L 27/0816; F16L 27/087; F16L 27/0849; G01B 7/30
USPC .......................................... 285/273, 278, 93
See application file for complete search history.

(56) References Cited

U.S. PATENT DOCUMENTS

| | | | |
|---|---|---|---|
| 2020/0355247 A1* | 11/2020 | Rhee | F16L 27/087 |
| 2022/0136208 A1* | 5/2022 | Okada | F16L 27/087 |
| | | | 285/93 |
| 2024/0102789 A1* | 3/2024 | Janson | G01B 7/30 |

FOREIGN PATENT DOCUMENTS

| | | |
|---|---|---|
| CN | 214037295 U | 8/2021 |
| JP | 62007458 U | 1/1987 |
| JP | 6592327 B2 | 10/2019 |

OTHER PUBLICATIONS

Office Action issued on Mar. 19, 2024, in corresponding Japanese Patent Application No. 2023-066523, 9 pages.

* cited by examiner

*Primary Examiner* — David Bochna
(74) *Attorney, Agent, or Firm* — Maier & Maier, PLLC (57) ABSTRACT

A rotary joint capable of measuring a rotation angle with high accuracy includes: a flange; a rotor whose one end is connected with the flange and has a tubular shape; a shaft whose outer periphery is connected with an inner periphery of the rotor so that the shaft is rotatable about a central axis of the rotor as a rotation axis; and a rod whose one end is connected with the flange and is provided in an opening to extend from one end side of the shaft along the central axis; an angle measurement unit connected with the opening to extend from another end side of the shaft to another end of the rod and measures a rotation angle between the rod and the shaft with the central axis as the rotation axis; and a shield member formed in a cup shape.

7 Claims, 8 Drawing Sheets

ROTATING JOINT

TECHNICAL FIELD

The present invention relates to a rotary joint.

BACKGROUND ART

A rotary joint that conveys liquid flowing through a fixed duct line to a rotating object has been conventionally known.

Regarding the rotary joint, Patent Literature 1 discloses a swivel joint in which a rotation angle of a rod that is secured on one of an inner body and an outer body and that is inserted through a pilot oil passage provided in the inner body is detected by a sensor secured on the other of the inner body and the outer body.

CITATION LIST

Patent Literature

Patent Literature 1: JP 6592327B2

SUMMARY OF INVENTION

Technical Problem

However, according to the technique described in Patent Literature 1, since the sensor faces the oil passage, there is a possibility that adherence of a foreign substance flowing through the passage, a foreign substance contained in oil, or the like to the sensor decreases accuracy of measurement of the rotation angle.

The present invention has been made in consideration of such an issue, and is directed to provision of a rotary joint capable of measuring a rotation angle with high accuracy.

Solution to Problem

To solve the above-mentioned issue, a rotary joint according to the present invention includes: a flange; a rotor whose one end is connected with the flange and that has a tubular shape; a shaft whose outer periphery is connected with an inner periphery of the rotor so that the shaft is rotatable about a central axis of the rotor as a rotation axis, the shaft including an opening formed along the central axis; a rod whose one end is connected with the flange and that is provided in the opening so as to extend from one end side of the shaft along the central axis; an angle measurement unit that is connected with the opening so as to extend from another end side of the shaft to another end of the rod and that measures a rotation angle between the rod and the shaft with the central axis serving as the rotation axis; and a shield member that is formed in a cup shape, an outer periphery of the shield member being connected with the opening so that the shield member is rotatable along the central axis, the other end of the rod being connected with an inner periphery of the shield member, and the shield member acting as a shield between the rod and the angle measurement unit in the opening.

Additionally, the shield member is fitted to an inner periphery of the opening with annular members provided on the outer periphery of the shield member so that the shield member is rotatable along the central axis.

Additionally, the rotary joint according to the present invention further includes a magnet provided between the other end of the rod and an inner bottom surface of the shield member, in which the angle measurement unit measures a change in magnetic field generated from the magnet with a magnetic sensor provided on a surface facing an outer bottom surface of the shield member and measures the rotation angle based on a result of the measurement.

Additionally, the hole serves as a drain oil passage.

Additionally, the flange includes a duct line extending from an outside to the one end of the shaft. The shaft includes a discharge opening that extends from the opening to the outer periphery of the shaft, and one end side of the shaft is connected with the duct line so as that the shaft is rotatable about the central axis as the rotation axis.

Advantageous Effects of Invention

According to the present invention, the rotary joint is capable of measuring the rotation angle with high accuracy.

DESCRIPTION OF EMBODIMENTS

An embodiment of the present invention (hereinafter referred to as "the present embodiment") will be described below with reference to the accompanying drawings. In each drawing, an identical component and an identical step are each denoted by an identical reference number as much as possible for facilitating understanding, and an overlapping description is omitted.

Figure 1:
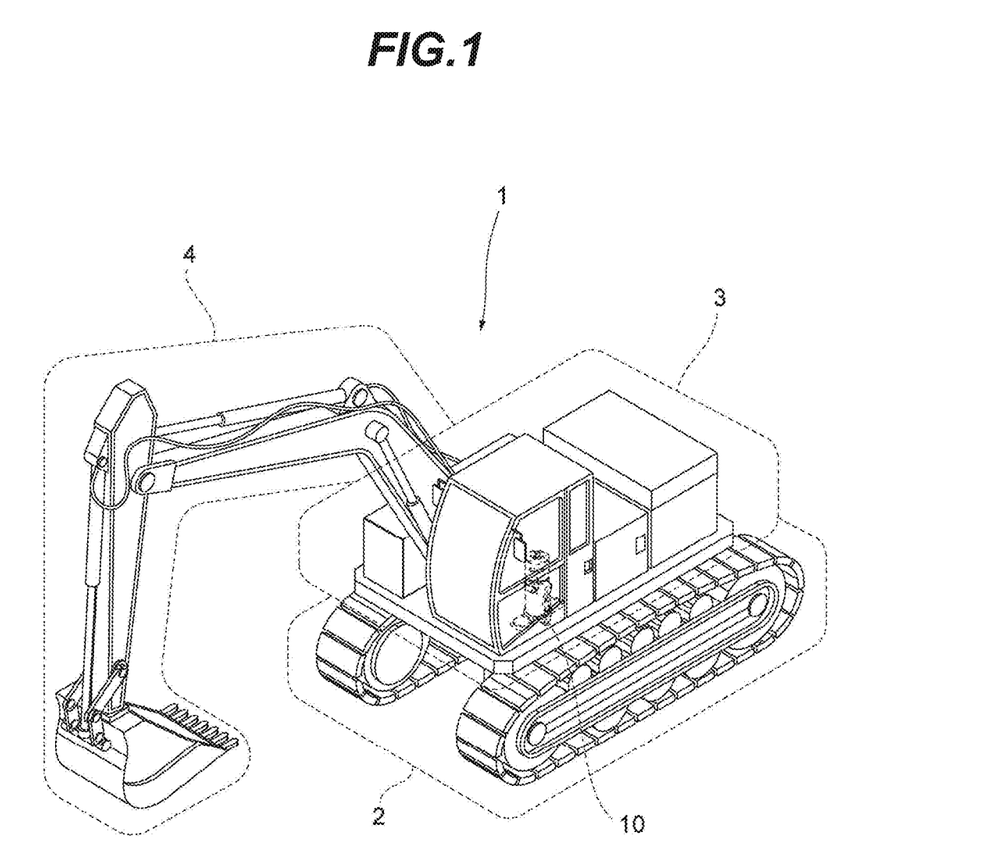
FIG. 1 is a view illustrating a construction machine on which a rotary joint according to the present embodiment is mounted.

FIG. 1 is a view illustrating a construction machine 1 on which a rotary joint 10 according to the present embodiment is mounted. As illustrated in FIG. 1, the construction machine 1 is, for example, a shovel-loader, a crane truck, or the like, and includes a traveling body 2, a revolving body 3, an arm portion 4, and the rotary joint 10.

The traveling body 2 is provided, for example, in a lower portion of the construction machine 1. The traveling body 2 supports the whole of the construction machine 1, and also causes the construction machine 1 to travel forward and backward according to a control signal, a control instruction, a control operation, or the like transmitted from a cab in the revolving body 3 by an operation by a driver of the construction machine 1. The traveling body 2 is configured to include, for example, a crawler track such as a caterpillar track, and a hydraulic rotation actuator for rotating a wheel of the crawler track (hereinafter referred to as a hydraulic motor). Additionally, the traveling body 2 is provided with a rotary strut in an upper portion, and the revolving body 3 is connected with the traveling body 2 so that the revolving body 3 is rotatable about an axis perpendicular to an installation surface of the traveling body 2 as a rotation axis via the rotary strut. Additionally, the rotary joint 10, which is formed so that an upper portion of the rotary joint 10 and a lower portion thereof are mutually rotatable about a central axis as a rotation axis, is connected with the upper portion of the traveling body 2. The traveling body 2 is supplied with oil for hydraulic control from the revolving body 3 via the rotary joint 10.

The revolving body 3 is provided above the traveling body 2, and is connected with the traveling body 2 so that the revolving body 3 is rotatable with respect to the traveling body 2 about the axis perpendicular to the installation surface of the traveling body 2 as the rotation axis via the rotary strut connected with the lower portion of the revolving body 3. The revolving body 3 is configured to include, for example, the cab on which the driver of the construction machine 1 rides and that is used for controlling an operation of the construction machine 1, and a hydraulic pump for supplying oil to each component that operates with hydraulic pressure of the construction machine 1. The arm portion 4 is connected with the upper portion of the revolving body 3. The revolving body 3 supplies oil to the arm portion 4 from the hydraulic pump. Additionally, the rotary joint 10 is connected with the lower portion of the revolving body 3. The revolving body 3 supplies oil to the traveling body 2 from the hydraulic pump via the rotary joint 10.

The arm portion 4 is, for example, a multi-joint hydraulic arm provided with a working portion such as a bucket used for construction work at a leading end of the arm portion 4, and is provided above the revolving body 3. The arm portion 4 causes each joint portion and the working portion to operate with oil supplied from the hydraulic pump according to the control signal, the control instruction, the control operation, or the like transmitted from the cab of the revolving body 3.

The rotary joint 10 is, for example, a rotary swivel joint, and supplies oil from the revolving body 3 to the traveling body 2. The rotary joint 10 is provided between the traveling body 2 and the revolving body 3. The upper end of the rotary joint 10 is connected with the lower portion of the revolving body 3. The lower end of the rotary joint 10 is connected with the upper portion of the traveling body 2. Additionally, the rotary joint 10 has a tubular shape and is formed so that the upper portion of the rotary joint 10 and the lower portion thereof are mutually rotatable about the central axis of the tube as the rotation axis. Furthermore, the rotary joint 10, to supply oil to the traveling body 2, discharges drain oil in the hydraulic motor provided in the traveling body 2 to a tank provided in the revolving body 3.

Figure 2:
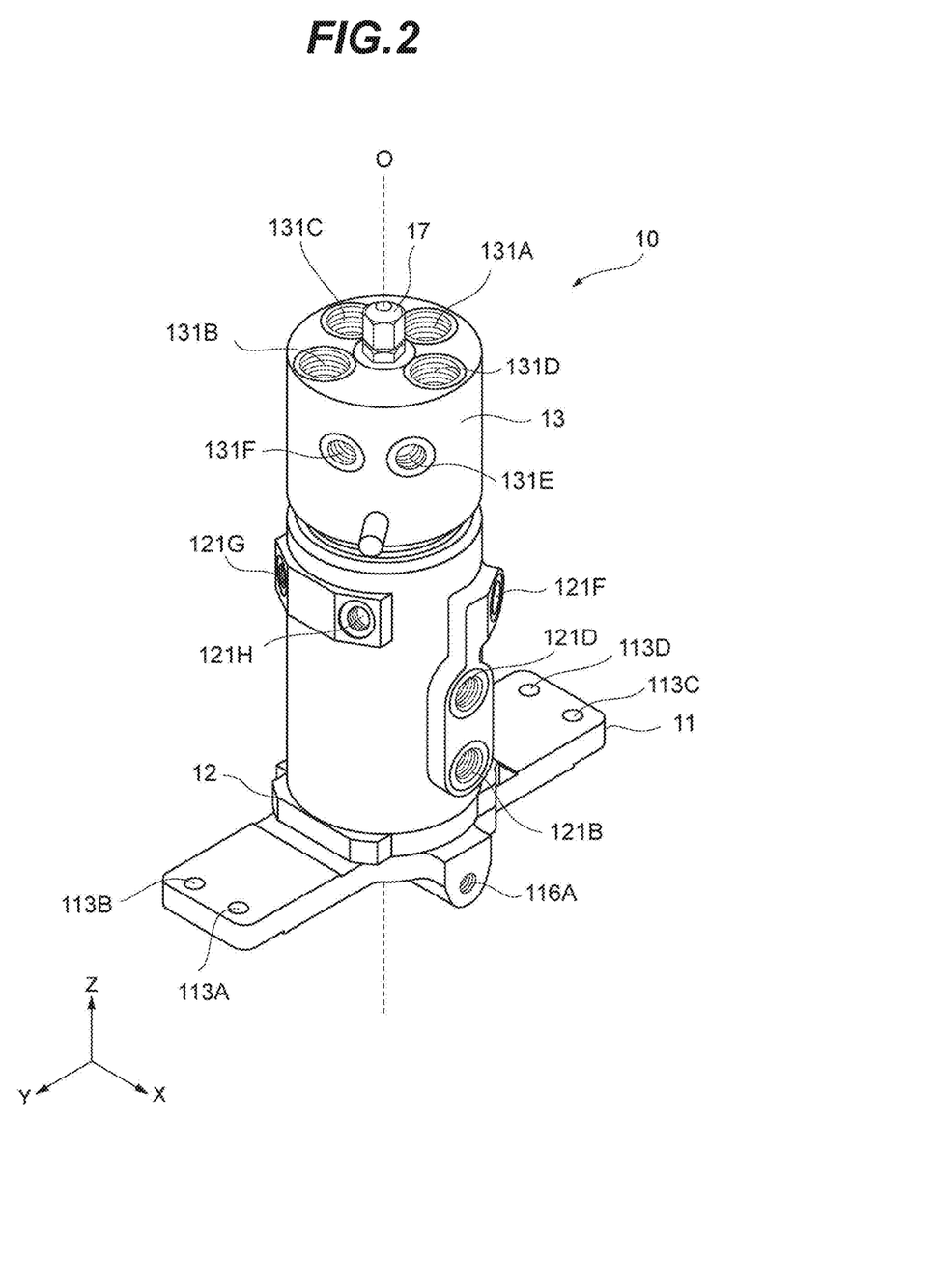
FIG. 2 is a perspective view illustrating a configuration of the rotary joint illustrated in FIG. 1.
Figure 3A:
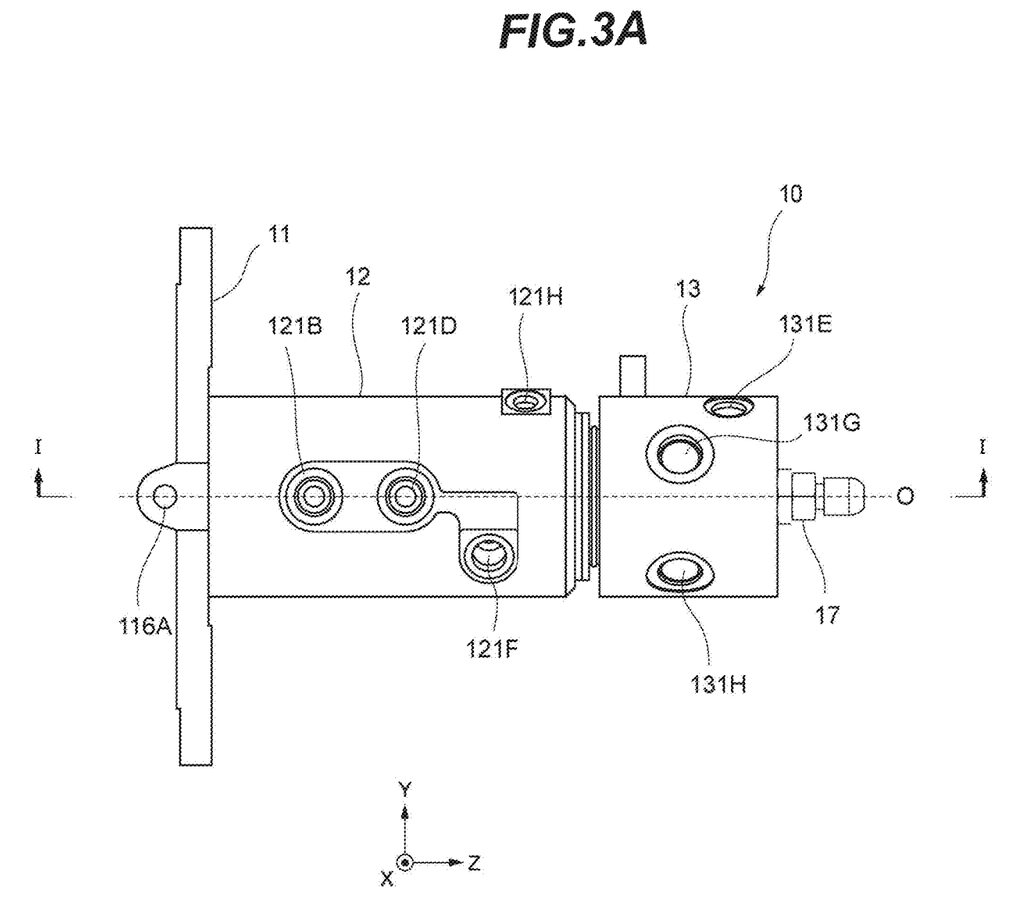
FIG. 3A is a side view of the rotary joint illustrated in FIG. 1.
Figure 3B:
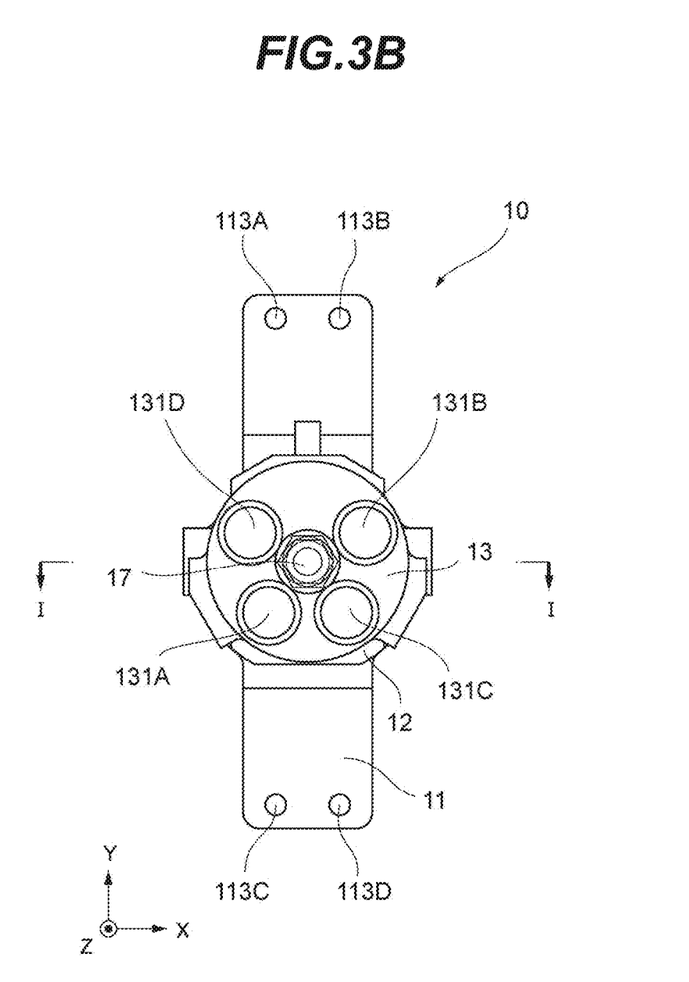
FIG. 3B is a top view of the rotary joint illustrated in FIG. 1.
Figure 4:
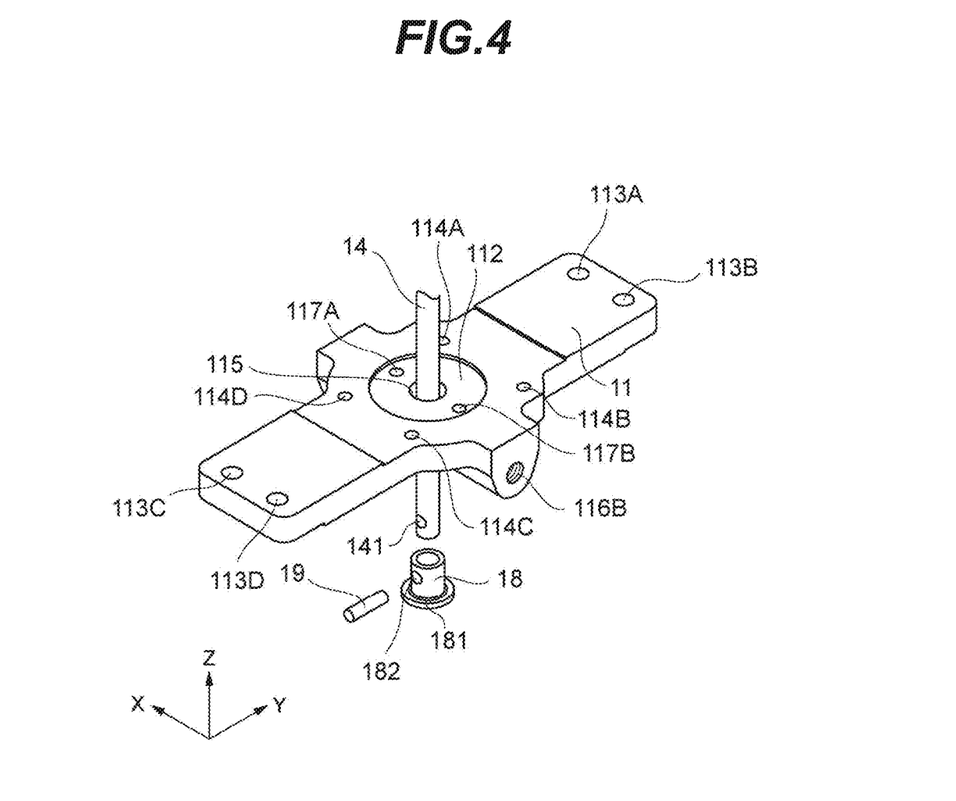
FIG. 4 is a perspective view illustrating a configuration of a connection portion between a flange of the rotary joint and a rod of the rotary joint illustrated in FIG. 1.
Figure 5:
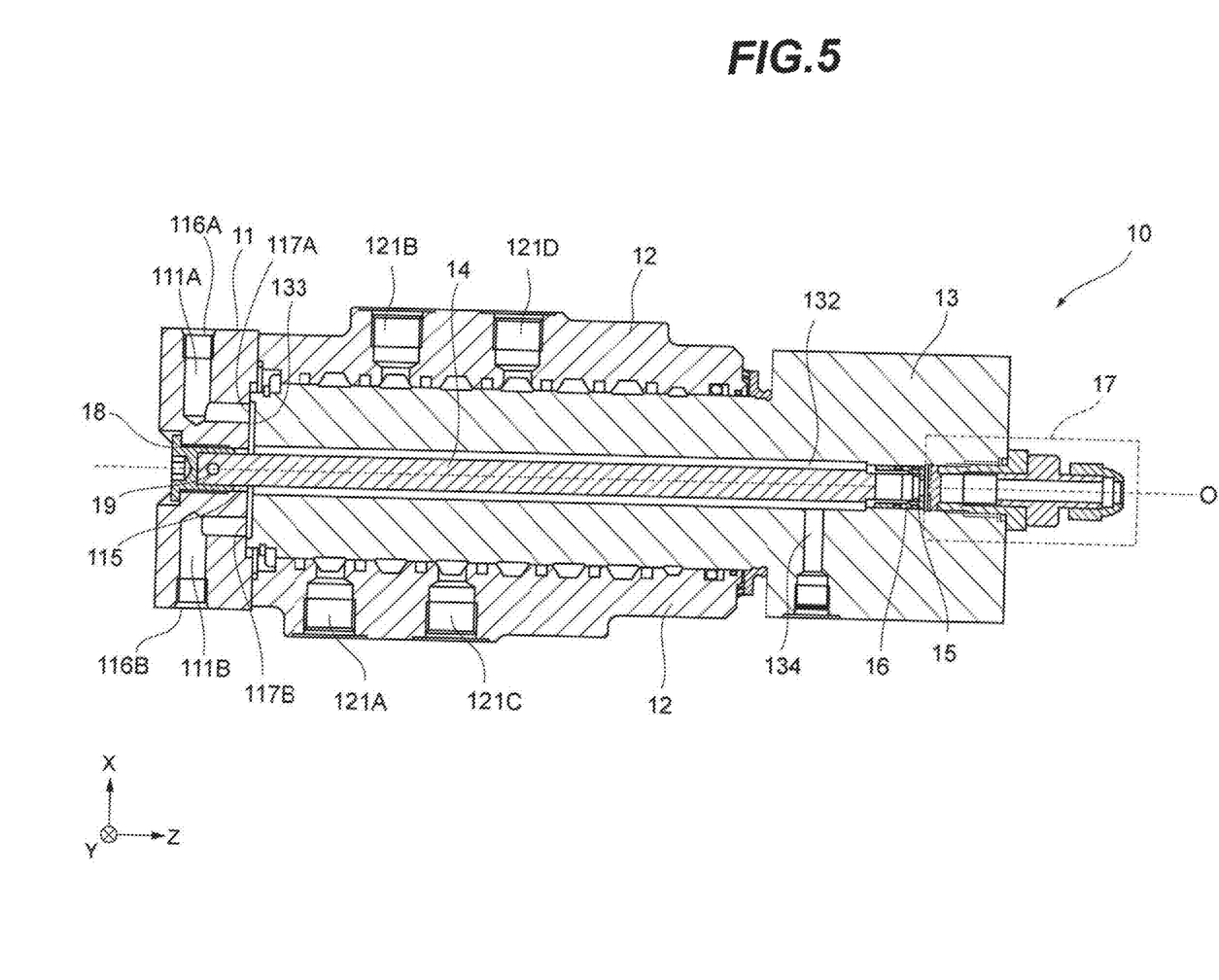
FIG. 5 is a cross-sectional view of the rotary joint illustrated in FIG. 1 along an I-I line.

Subsequently, a configuration of the rotary joint 10 is described. FIG. 2 is a perspective view illustrating a configuration of the rotary joint 10 illustrated in FIG. 1. Additionally, FIG. 3A is a side view of the rotary joint 10 illustrated in FIG. 1. FIG. 3B is a top view of the rotary joint 10 illustrated in FIG. 1. Furthermore, FIG. 4 is a perspective view illustrating a configuration of a connection portion between a flange 11 of the rotary joint 10 and a rod 14 of the rotary joint 10 illustrated in FIG. 1. Moreover, FIG. 5 is a cross-sectional view of the rotary joint 10 illustrated in FIG. 1 along an I-I line.

As illustrated in FIGS. 2, 3A to 3C, 4, and 5, the rotary joint 10 is configured to include, for example, the flange 11, a rotor 12, a shaft 13, the rod 14, a magnet 15, a shield member 16, an angle measurement unit 17, a fixing member 18, and a pin 19. Note that in the present embodiment, assume that a direction that is perpendicular to an installation surface of the rotary joint 10 and that extends from a lower end side of the rotary joint 10 to an upper end side of the rotary joint 10 along a central axis O is a Z-axis direction. Additionally, assume that a direction that is perpendicular to a Z-axis and that extends from a central portion of the flange 11 to one of two ends of a plate-like portion of the flange 11 where run-through holes 113A and 113B exist is a Y-axis direction. Furthermore, assume that a direction that is perpendicular to the Z-axis and a Y-axis and that extends from a connection port 116A on an outer periphery portion of a duct line 111B in the flange 11 to a connection port on an outer periphery portion of a duct line 111A is an X-axis direction.

A structure of the FIG. 11 is now described with reference to FIGS. 4 and 5. The flange 11 is a member for fixing the rotary joint 10 to the installation surface of the rotary joint 10. The flange 11 is configured to include, for example, the plate-like portion and a tubular portion that is formed so that one of two ends of the tubular portion extends in the X-axis direction and the other thereof extends in an opposite direction of the X-axis direction. Additionally, the flange 11 is provided with a circular recess portion 112 in the central portion of the plate-like portion when viewed from the Z-axis direction. Furthermore, the flange 11 is provided with an opening 115 that penetrates the plate-like portion and the tubular portion from a top surface of the flange 11 and a bottom surface of the flange 11 at the center of the recess portion 112. The recess portion 112 functions as part of a drain oil passage for causing drain oil to flow into the rotary joint 10.

The flange 11 is provided with two connection ports of connection ports 117A and 117B around the opening 115 in the recess portion 112. The flange 11 is provided with the connection port 116A on a surface at one end on the X-axis direction side out of two ends of the tubular portion. The connection port 116A leads to the connection port 117A via the duct line 111A. Additionally, the flange 11 is provided with a connection port 116B on a surface at the other end on the opposite side of the X-axis direction, out of the two ends of the tubular portion. The connection port 116B leads to the connection port 117B via the duct line 111B. The duct line 111A extending from the connection port 116A to the recess portion 112 via the connection port 117A functions as the drain oil passage for causing drain oil to flow into the rotary joint 10. Additionally, the duct line 111B extending from the connection port 116B to the recess portion 112 via the connection port 117B functions as the drain oil passage for causing drain oil to flow into the rotary joint 10.

One end of the rod 14 is inserted into the opening 115 from the Z-axis direction and is connected with the flange 11 via the fixing member 18. Specifically, in the flange 11, the fixing member 18 is fitted to the opening 115 on a bottom surface side, which is the opposite side of the Z-axis direction. The fixing member 18 mentioned herein is a member for fixing and connecting the rod 14 to/with the flange 11, and is formed to have a cap shape. The fixing member 18 is provided with an annular member 181 on an outer periphery of the fixing member 18. The annular member 181 is, for example, an O-ring formed of resin, and is connected with the fixing member 18 so as to encircle the outer periphery of the fixing member 18. The outer periphery of the fixing member 18 is fitted to an inner periphery of the opening 115 on the bottom surface side via the annular member 181.

Additionally, an outer periphery of the rod 14 is fitted to an inner periphery of the fixing member 18. The fixing member 18 is provided with an opening 182 in a fitting portion to which the rod 14 is fitted. The opening 182 penetrates from the inner periphery of the fixing member 18 to the outer periphery of the fixing member 18. Additionally, an opening 141 having a diameter that is equal to a diameter of the opening 182 provided in the fixing member 18 is provided at one end of the rod 14. In the fixing member 18, the pin 19 is fitted to the opening 182 and the opening 141 so as to penetrate the opening 182 and the opening 141. Furthermore, the fixing member 18 is fitted to or screwed into the opening 115 of the flange 11 from the bottom surface side, and thereby fixes and connects the rod 14 to/with the flange 11.

The flange 11 is provided with the run-through holes 113A and 113B at one end on the Y-axis direction side out of the two ends of the plate-like portion. Additionally, the flange 11 is provided with run-through holes 113C and 113D at the other end on the opposite side of the Y-axis direction out of the two ends of the plate-like portion. In the flange 11, respective bolts are inserted into the run-through holes 113A to 113D, and the bolts are inserted into respective mounting holes in a top surface of the traveling body 2, whereby the bottom surface of the flange 11 is connected with the upper portion of the traveling body 2. Additionally, the flange 11 is provided with run-through holes 114A to 114D so as to surround the holes in the plate-like portion. In the flange 11, respective bolts are inserted into the run-through holes 114A to 114D, and the bolts are inserted into respective female threads at one end of the rotor 12, whereby one end of the rotor 12 is connected with the top surface of the flange 11.

Figure 3C:
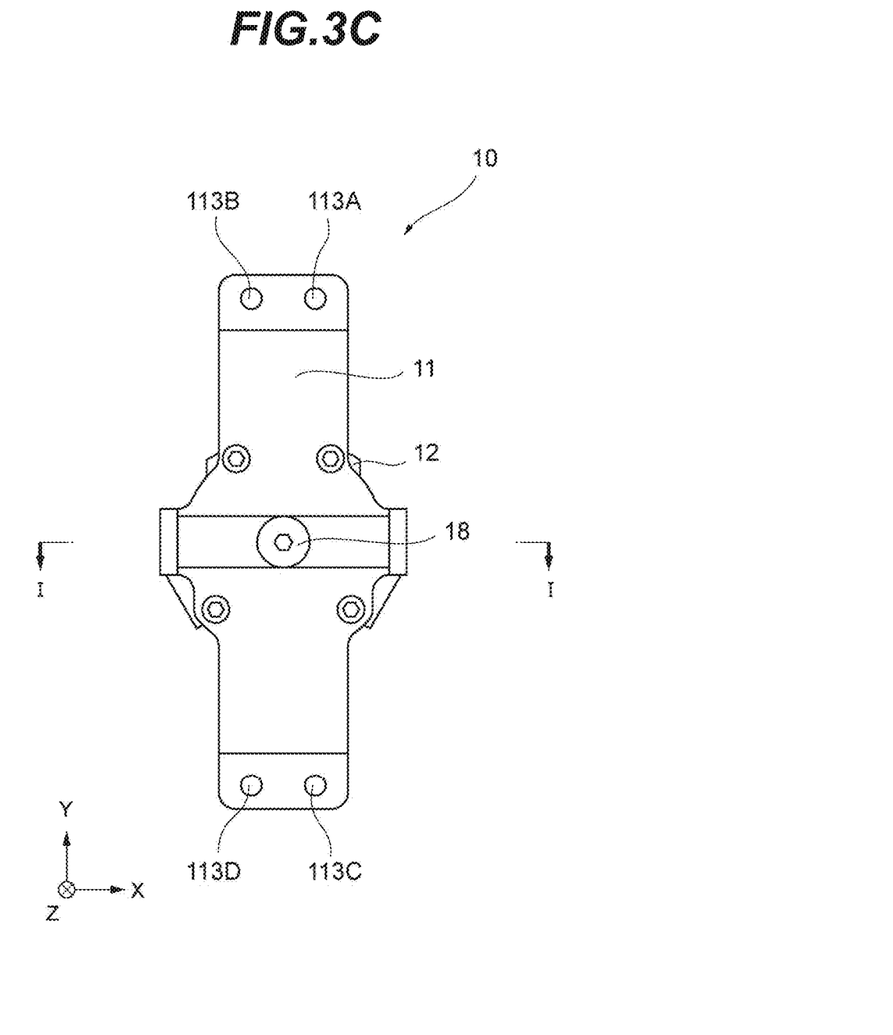
FIG. 3C is a bottom view of the rotary joint illustrated in FIG. 1.

A structure of the rotor 12 is now described with reference to FIGS. 3A, 3C, and 5. The rotor 12 is a member formed in a tubular shape, and supplies oil flowing from the shaft 13 to members that are connected with the outer periphery of the rotor 12 and that are provided in the traveling body 2 via the oil passage provided inside the rotor 12. Examples of oil flowing into the shaft 13 include supply oil to a hydraulic motor, return oil from the hydraulic motor, and pilot oil. Additionally, examples of the oil passage provided inside the rotor 12 include a supply oil passage to the hydraulic motor, a return oil passage from the hydraulic motor, and a pilot oil passage. One end of the rotor 12 on the bottom surface side in the opposite direction of the Z-axis direction out of two ends of the rotor 12 is connected with the top surface side of the plate-like portion of the flange 11. Additionally, the outer periphery of the shaft 13 is connected with the inner periphery of the rotor 12 so that the rotor 12 is rotatable about the central axis O as the rotation axis.

The rotor 12 is provided with oil passages 121A to 121H between the outer periphery and inner periphery of the rotor 12. The oil passages 121A to 121H are used to supply oil flowing from the shaft 13 to the members that are connected with the outer periphery of the rotor 12 and that are provided in the traveling body 2. The oil passages 121A to 121H are duct lines that lead from respective oil passages on the inner periphery of the rotor 12 to respective connection ports on the outer periphery of the rotor 12. The oil passages 121A to 121H are connected with respective connection ports that are associated with the respective oil passages on the inner periphery and that are disposed on the outer periphery of the shaft 13. Additionally, the respective connection ports on the outer periphery for the oil passages 121A to 121H are connected with respective connection ports of members associated with the oil passages 121A to 121H out of the members provided in the traveling body 2.

A structure of the shaft 13 is now described with reference to FIGS. 3A, 3B, and 5. The shaft 13 is a member formed in a tubular shape, and supplies oil flowing from members that are connected with a top surface of the shaft 13 and that are provided in the revolving body 3 to the rotor 12 connected with the outer periphery of the shaft 13 via the oil passages provided inside the shaft 13. Additionally, the shaft 13 discharges drain oil flowing from the flange 11 from a discharge opening 134 provided in the outer periphery of the shaft 13 via an opening 132 provided inside the shaft 13.

The outer periphery of the shaft 13 in a lower portion on the opposite side of the Z-axis direction is connected with the inner periphery of the rotor 12 so that the shaft 13 is rotatable about the central axis O of the rotor 12 as the rotation axis. Additionally, the shaft 13 is provided with a recess portion 133 at one end on the lower portion side out of the two ends of the shaft 13. The recess portion 133 centers on the central axis O. One end of the shaft 13 on the opposite side of the Z-axis direction is coupled with the top surface side of the flange 11 so that the shaft 13 is rotatable about the central axis O as the rotation axis. Furthermore, in the shaft 13, the recess portion 133 is connected with the duct lines 111A and 111B of the flange 11 so that the shaft 13 is rotatable about the central axis O as the rotation axis. Additionally, in the shaft 13, formed is the opening 132 extending from the recess portion 133, along the central axis O, to the other end of the shaft 13 in the upper portion on the Z-axis direction side out of the two ends of the shaft 13. Additionally, the shaft 13 includes the discharge opening 134 that extends from the opening 132 to the outer periphery in the upper portion of the shaft 13. The opening 132, the recess portion 133, and the discharge opening 134, together with the duct lines 111A and 111B in the flange 11, function as the drain oil passage.

The shaft 13 is provided with connection ports 131A to 131D around the opening 132 on the top surface of the shaft 13 in the upper portion. The connection ports 131A to 131D are used to circulate oil between the shaft 13 and the revolving body 3. Additionally, the shaft 13 is provided with connection ports 131E to 131H on the outer periphery of the shaft 13 in the upper portion. The connection ports 131E to 131H are used to circulate oil between the shaft 13 and the revolving body 3. The connection ports 131A to 131H lead to, via the oil passages provided inside the shaft 13, respective oil passages associated with the connection ports 131A to 131H, out of a plurality of oil passages provided in the outer periphery of the shaft 13 in the lower portion.

In the shaft 13, the rod 14 is provided in the opening 132 from the one end side of the shaft 13, which is the opposite side of the Z-axis direction, via the recess portion 112 of the flange 11 and the recess portion 133 of the shaft 13 so that the rod 14 is not in direct contact with the inner periphery of the opening 132. Additionally, the angle measurement unit 17 is connected with the shaft 13 from the other end side, which is the Z-axis direction side, for example, by being screwed into the opening 132. Furthermore, in the shaft 13, the outer periphery of the shield member 16 formed in a cup shape to cover the outer periphery of the rod 14 at the other end is fitted to the inner periphery of the opening 132 so that the shield member 16 is rotatable about the central axis O as the rotation axis.

Figure 6:
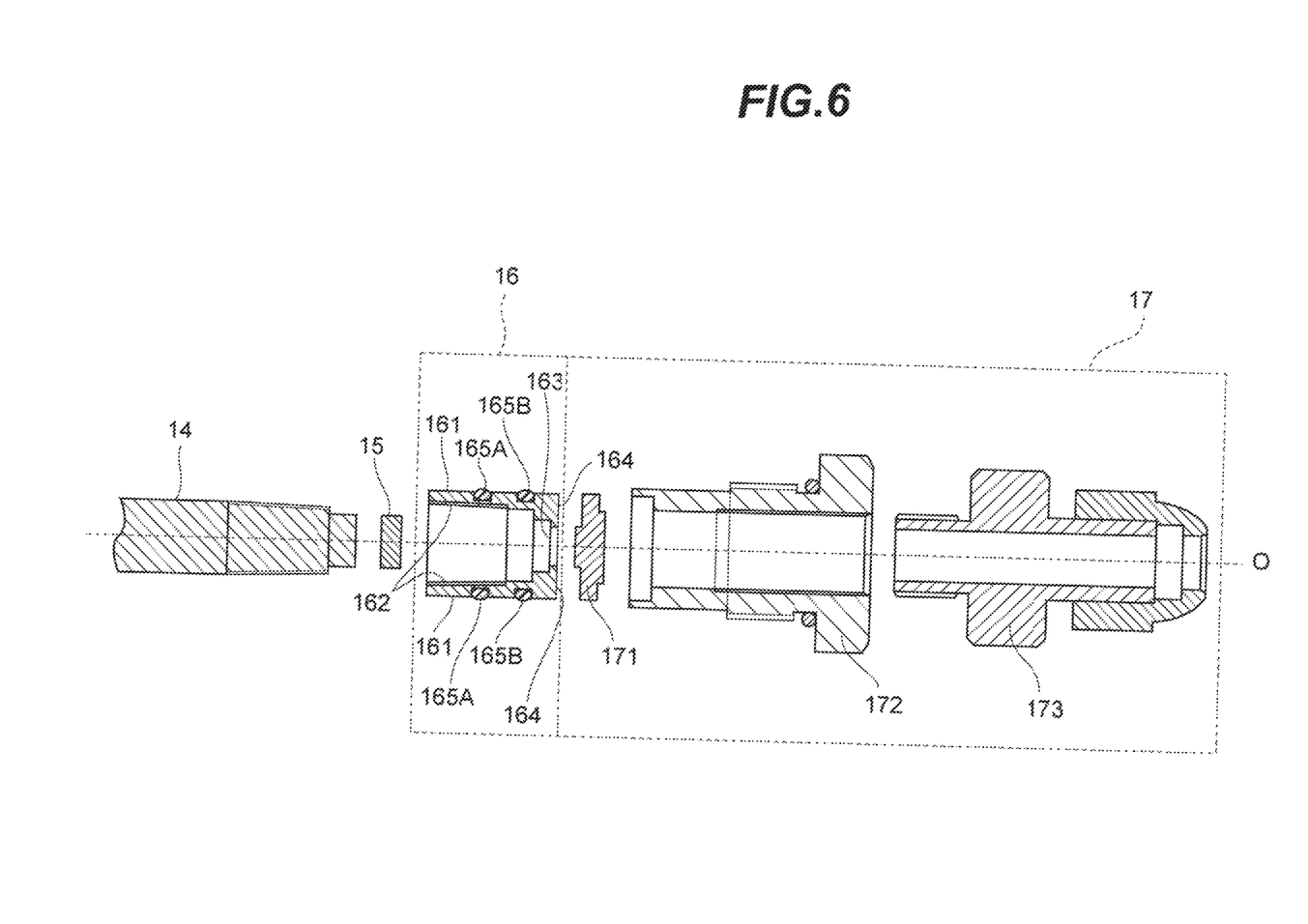
FIG. 6 is a cross-sectional view of the rod, a magnet, a shield member, and an angle measurement unit, which are illustrated in FIG. 5, along the I-I line.

The rod 14, the magnet 15, the shield member 16, and the angle measurement unit 17 are now described with reference to FIGS. 4 to 6. The rod 14 is formed in a columnar shape, and one end of the rod 14 on the opposite side of the Z-axis direction is connected with the inner periphery of the fixing member 18, whereby the rod 14 is connected with the opening 115 of the flange 11 via the fixing member 18 and is provided inside the opening 132 so as to extend from one end side of the shaft 13 along the central axis O. Additionally, the outer periphery of the rod 14 at the other end in the Z-axis direction is connected with an inner periphery 162 of the shield member 16 formed in the cup shape by fitting or screwing. The magnet 15 is provided between a top surface of the rod 14 at the other end and an inner bottom surface 163 of the shield member 16. Furthermore, the rod 14 is provided in the opening 132 so that a portion between one end of the rod 14 and the other end of the rod 14 is not in direct contact with the inner periphery of the opening 132.

The magnet 15 is, for example, a permanent magnet, and generates a magnetic field. The magnet 15 is provided between the inner bottom surface 163 of the shield member 16 and the top surface of the rod 14 at the other end. The magnet 15 is used by the angle measurement unit 17 to measure a rotation angle between the shaft 13 and the rod 14 with the central axis O serving as the rotation axis.

The shield member 16 is made of a non-magnetic material and formed in a cup shape, and acts as a shield between the rod 14 and the angle measurement unit 17 in the opening 132 of the shaft 13. Additionally, an opening is formed in a central portion of the bottom surface of the shield member 16. The outer periphery of the rod 14 at the other end is connected with the inner periphery 162 of the shield member 16 by fitting or screwing. Additionally, the magnet 15 is provided between the inner bottom surface 163 of the shield member 16 and the top surface of the rod 14 at the other end so that a surface of the magnet 15 in the Z-axis direction is exposed from an opening provided in the central portion of the bottom surface of the shield member 16. Note that a sealing material is applied to the inner periphery 162 of the shield member 16 to maintain oil-tightness of the magnet 15. Additionally, the shield member 16 is provided with annular members 165A and 165B on an outer periphery 161 so as to encircle the outer periphery 161. The shield member 16 is fitted to the inner periphery of the opening 132 via the annular members 165A and 165B so that the outer periphery 161 is rotatable along the central axis O. Additionally, an outer bottom surface 164 of the shield member 16 faces a measurement surface of the angle measurement unit 17 in the opening 132.

Each of the annular members 165A and 165B is, for example, an O-ring formed of resin, and is provided in the shield member 16 so as to encircle the outer periphery 161 of the shield member 16. The annular members 165A and 165B are provided between the shield member 16 and the inner periphery of the opening 132 so as to generate such friction as to allow the shaft 13 to rotate with respect to the rod 14 about the central axis O as the rotation axis to such a degree as that drain oil flowing on the rod 14 side in the opening 132 of the shaft 13 does not leak to the one side of the shaft 13 with which the angle measurement unit 17 is connected.

The angle measurement unit 17 is, for example, a magnet-type angle sensor, and measures a rotation angle between the rod 14 and the shaft 13 with the central axis O serving as the rotation axis. The angle measurement unit 17 transmits the measured rotation angle to a control device of the construction machine 1 in the revolving body 3, the traveling body 2, or the like. The angle measurement unit 17 includes a magnetic sensor 171, a socket 172, and a fixing member 173.

The socket 172 is formed in a tubular shape, and an outer periphery of the socket 172 is connected with the inner periphery of the opening 132 by, for example, screwing so that the socket 172 extends from the other end side of the shaft 13 to the other end of the rod 14. A surface of the socket 172 at one end on the opposite side of the Z-axis direction out of two ends of the socket 172 is a measurement surface, which is provided with the magnetic sensor 171. The measurement surface faces the magnet 15 on the shield member 16 and the outer bottom surface 164 of the shield member 16, and is located at a distance of, for example, about 3.0 mm from the surface of the magnet 15 on the Z-axis direction side. Additionally, the outer periphery of the fixing member 173 is connected with the inner periphery of the socket 172 at the other end, which is the Z-axis direction side, out of the two ends of the socket 172. The socket 172 transmits a signal output from the magnetic sensor 171 to the control device of the construction machine 1 in the revolving body 3, the traveling body 2, or the like via a signal line that is provided inside the socket 172, the fixing member 173, and an external communication cable.

The magnetic sensor 171 is provided on the measurement surface of the angle measurement unit 17, and measures a change in magnetic field generated from the magnet 15. The magnetic sensor 171 measures the rotation angle between the rod 14 and the shaft 13 with the central axis O serving as the rotation axis from the measured change in magnetic field. The magnetic sensor 171 uses a result of the measurement as an electric signal, outputs the electric signal to the control device of the construction machine 1 in the revolving body 3, the traveling body 2, or the like via the signal line in the socket 172, the fixing member 173, and the external communication cable.

The fixing member 173 is a member for fixing the communication cable that connects the rotary joint 10 and the control device of the construction machine 1 to the rotary joint 10. The outer periphery of the fixing member 173 at one end is connected with the inner periphery of the socket 172 at the other end on the Z-axis direction side out of the two ends of the socket 172, by screwing, fitting, or the like. The other end of the fixing member 173 is connected with the communication cable.

<Effects>

As described above, in the present embodiment, the rotary joint 10 includes the flange 11, the tubular rotor 12 whose one end is connected with the flange 11, and the shaft 13 whose outer periphery is connected with the inner periphery of the rotor 12 so as to be rotatable about the central axis O of the rotor 12 as the rotation axis and in which the opening 132 is formed along the central axis O. Additionally, the rotary joint 10 includes the rod 14 whose one end is connected with the flange 11 and that is provided in the opening 132 so as to extend from the one end side of the shaft 13 along the central axis O, and the angle measurement unit 17 that is connected with the opening 132 so as to extend from the other end side of the shaft 13 to the other end of the rod 14 and that measures the rotation angle between the rod 14 and the shaft 13 with the central axis O serving as the rotation axis. Furthermore, the rotary joint 10 further includes the shield member 16 that is formed in the cup shape. The outer periphery 161 is connected with the opening 132 so that the shield member 16 is rotatable along the central axis O. The other end of the rod 14 is connected with the inner periphery 162. The shield member 16 acts as a shield between the rod 14 and the angle measurement unit 17 in the opening 132.

With this configuration, in the rotary joint 10, the shield member 16 acts as a shield between the rod 14 side and the angle measurement unit 17 side in the opening 132. As a result, a foreign substance flowing on the rod 14 side in the opening 132 is prevented from adhering to the angle measurement unit 17. Hence, the rotary joint 10 is capable of measuring the rotation angle between the shaft 13 and the rod 14 with the central axis O serving as the rotation axis with high accuracy.

Additionally, the shield member 16 is fitted to the inner periphery of the opening 132 with the annular members 165A and 165B provided on the outer periphery 161 of the shield member 16 so that the shield member 16 is rotatable along the central axis O.

With this configuration, in the rotary joint 10, the annular members 165A and 165B adjust the extending direction of the rod 14 to the direction of the central axis O of the shaft 13. Hence, the rotary joint 10 is capable of preventing the extending direction of the rod 14 from being inclined with respect to the central axis O of the shaft 13. Additionally, the rotary joint 10 is capable of measuring the rotation angle between the shaft 13 and the rod 14 with the central axis O serving as the rotation axis using a smaller number of components.

Additionally, the rotary joint 10 further includes the magnet 15 provided between the other end of the rod 14 and the inner bottom surface 163 of the shield member 16. Additionally, the angle measurement unit 17 measures the change in magnetic field generated from the magnet 15 with the magnetic sensor 171 provided on a surface facing the outer bottom surface 164 of the shield member 16, and measures the rotation angle based on a result of the measurement.

With this configuration, in the rotary joint 10, a foreign substance flowing on the rod 14 side in the opening 132 is prevented from adhering to, in addition to the angle measurement unit 17, the magnet 15. Hence, the rotary joint 10 measures the rotation angle based on the change in magnetic field, and can thereby measure the rotation angle between the shaft 13 and the rod 14 with the central axis O serving as the rotation axis with high accuracy.

Additionally, the shield member 16 is formed of the non-magnetic material.

Hence, since the shield member 16 is formed of the material that has less influence on a magnetic field, the rotary joint 10 is capable of measuring the rotation angle between the shaft 13 and the rod 14 with the central axis O serving as the rotation axis with higher accuracy.

Additionally, the opening 132 serves as the drain oil passage.

With this configuration, since the opening 132 serves as the drain oil passage, hydraulic pressure applied to the shield member 16 in the opening 132 decreases and strength necessary for the shield members 16 and the annular members 165A and 165B is suppressed in comparison with a case where the opening 132 serves as, for example, an oil passage other than the drain oil passage such as the pilot oil passage. Hence, since strength necessary for the shield member 16 and the annular members 165A and 165B is suppressed, the rotary joint 10 is capable of measuring the rotation angle between the shaft 13 and the rod 14 with the central axis O serving as the rotation axis at low cost.

Additionally, the flange 11 includes the duct line extending from the outside to one end of the shaft 13. Furthermore, the shaft 13 includes the discharge opening 134 that extends from the opening 132 to the outer periphery of the shaft 13, and one end side of the shaft 13 in the opening 132 is connected with the duct line so that the shaft 13 is rotatable about the central axis O as the rotation axis.

That is, in the rotary joint 10, the rod 14 is provided in the opening 132 out of the passage extending from the outside of the flange 11 to the discharge opening 134 via the opening 132. With this configuration, in the rotary joint 10, the opening 132 provided with the rod 14 is used as the passage, whereby it is possible to suppress an increase in size of the rotary joint 10.

<Modifications>

Note that the present invention is not limited to the above-described embodiment. That is, a modification obtained by addition of a design change to the above-mentioned embodiment as appropriate by the person skilled in the art is included in the scope of the present invention as long as the modification has the features of the present invention. Additionally, each element included in the above-mentioned embodiment and the modification, which will be described later, may be combined as long as it is technically possible, and a combination thereof is included in the scope of the present invention as long as the combination has the features of the present invention.

For example, in the present embodiment, the rod 14 is formed in the columnar shape, but the shape of the rod 14 is not limited thereto. The rod 14 may have any shape as long as, for example, the rod 14 extends from the flange 11 to the shield member 16 and the leading end of the rod 14 is connected with the inner periphery 162 of the shield member 16. The rod 14 may be formed, for example, in a prism shape. In a case where the rod 14 is formed in the prism shape, the inside of the shield member 16 is formed in a shape according to a shape of the leading end of the rod 14.

With this configuration, the rotary joint 10 is capable of measuring the rotation angle between the shaft 13 and the rod 14 with the central axis O serving as the rotation axis with high accuracy regardless of the shape of the rod 14.

Additionally, the shield member 16 is provided with the annular members 165A and 165B, such as O-rings, on the outer periphery 161, but the configuration is not limited thereto. An oil seal, a cap seal, or the like that is formed so that the surroundings of the annular members formed of metal are covered with resin may be provided on the outer periphery 161 of the shield member 16.

With this configuration, since a member other than the O-ring is used as a member for sealing oil in the shield member 16, the rotary joint 10 is capable of measuring the rotation angle between the shaft 13 and the rod 14 with the central axis O serving as the rotation axis with high accuracy also in a case where the member other than the O-ring such as the oil seal and the cap seal is appropriate in terms of cost or the like.

Additionally, the shield member 16 may be subjected to coating treatment with plating or the like. Additionally, a portion of the rod 14 in contact with the inner periphery 162 of the shield member 16 may be subjected to coating treatment with plating or the like.

According to the configuration, since abrasion of the rod 14 and the shield member 16 is reduced by the coating treatment, the rotary joint 10 is capable of measuring the rotation angle between the shaft 13 and the rod 14 with the central axis O serving as the rotation axis with high durability and high accuracy.

REFERENCE SIGNS LIST

10: Rotary joint
11: Flange
12: Rotor
13: Shaft
14: Rod
15: Magnet

16: Shield member
17: Angle measurement unit
111A: Duct line
111B: Duct line
131: Opening
132: Discharge opening
161: Outer periphery
162: Inner periphery
163: Inner bottom surface
164: Outer bottom surface
165A: Annular member
165B: Annular member
171: Magnetic sensor

The invention claimed is:

1. A rotary joint comprising:
a flange;
a rotor whose one end is connected with the flange and that has a tubular shape;
a shaft whose outer periphery is connected with an inner periphery of the rotor so that the shaft is rotatable about a central axis of the rotor as a rotation axis, the shaft including an opening which serves as a drain oil passage formed along the central axis and a discharge opening that extends from the opening to the outer periphery of the shaft;
a rod whose one end is connected with the flange and that is provided in the opening so as to extend from one end side of the shaft along the central axis;
an angle measurement unit that is connected with the opening so as to extend from another end side of the shaft to another end of the rod and that measures a rotation angle between the rod and the shaft with the central axis serving as the rotation axis; and
a shield member that is formed in a cup shape, an outer periphery of the shield member being connected with the opening so that the shield member is rotatable along the central axis, the other end of the rod being connected with an inner periphery of the shield member, and the shield member acting as a shield between the rod and the angle measurement unit in the opening and being provided away from the angle measurement unit.

2. The rotary joint according to claim 1, wherein the shield member is fitted to an inner periphery of the opening with annular members provided on the outer periphery of the shield member so that the shield member is rotatable along the central axis.

3. The rotary joint according to claim 2, further comprising a magnet provided between the other end of the rod and an inner bottom surface of the shield member,
wherein the angle measurement unit measures a change in magnetic field generated from the magnet with a magnetic sensor provided on a surface facing an outer bottom surface of the shield member and measures the rotation angle based on a result of the measurement.

4. The rotary joint according to claim 3, wherein
the flange includes a duct line extending from an outside to the one end of the shaft, and
one end side of the shaft is connected with the duct line so as that the shaft is rotatable about the central axis as the rotation axis.

5. The rotary joint according to claim 1, further comprising a magnet provided between the other end of the rod and an inner bottom surface of the shield member,
wherein the angle measurement unit measures a change in magnetic field generated from the magnet with a magnetic sensor provided on a surface facing an outer bottom surface of the shield member and measures the rotation angle based on a result of the measurement.

6. The rotary joint according to claim 5, wherein
the flange includes a duct line extending from an outside to the one end of the shaft, and
one end side of the shaft is connected with the duct line so as that the shaft is rotatable about the central axis as the rotation axis.

7. A rotary joint comprising:
a flange;
a rotor whose one end is connected with the flange and that has a tubular shape;
a shaft whose outer periphery is connected with an inner periphery of the rotor so that the shaft is rotatable about a central axis of the rotor as a rotation axis, the shaft including an opening which serves as a drain oil passage formed along the central axis;
a rod whose one end is connected with the flange and that is provided in the opening so as to extend from one end side of the shaft along the central axis;
an angle measurement unit that is connected with the opening so as to extend from another end side of the shaft to another end of the rod and that measures a rotation angle between the rod and the shaft with the central axis serving as the rotation axis; and
a shield member that is formed in a cup shape, an outer periphery of the shield member being connected with the opening so that the shield member is rotatable along the central axis, the other end of the rod being connected with an inner periphery of the shield member, and the shield member acting as a shield between the rod and the angle measurement unit in the opening;
wherein the flange includes a duct line extending from an outside to the one end of the shaft, and
the shaft includes a discharge opening that extends from the opening to the outer periphery of the shaft, and one end side of the shaft is connected with the duct line so as that the shaft is rotatable about the central axis as the rotation axis.

* * * * *